A. CARDIN.
HORSE HITCHING DEVICE
APPLICATION FILED APR. 27, 1908.

928,629.

Patented July 20, 1909.

Witnesses:

Inventor:
Adrien Cardin
By James M. Morton, Atty

UNITED STATES PATENT OFFICE.

ADRIEN CARDIN, OF FALL RIVER, MASSACHUSETTS.

HORSE-HITCHING DEVICE.

No. 928,629.　　　Specification of Letters Patent.　　　Patented July 20, 1909.

Application filed April 27, 1908. Serial No. 429,575.

*To all whom it may concern:*

Be it known that I, ADRIEN CARDIN, a citizen of the United States, residing at Fall River, in the county of Bristol and State of Massachusetts, have invented a new and useful Improvement in Horse-Hitching Devices, of which the following is a specification, like characters on the drawings representing like parts in the different figures and in the description.

My invention relates to devices for hitching or holding horses by attaching the rein or hitch rope to the wheel. In my device this is effected in such a way that the rein or hitch rope is tightened by the rotation of the wheel when the horse starts ahead, and is released when the horse backs.

Figure 1:
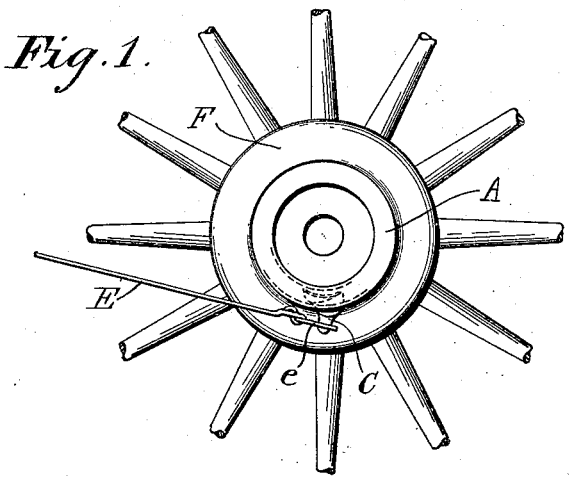
Figure 2:
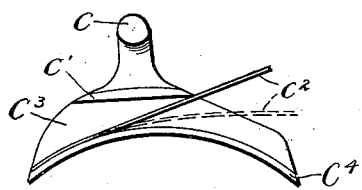
Figure 3:
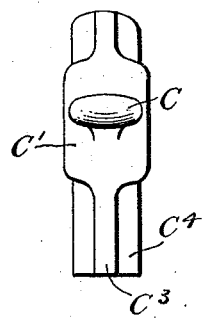
Figure 4:
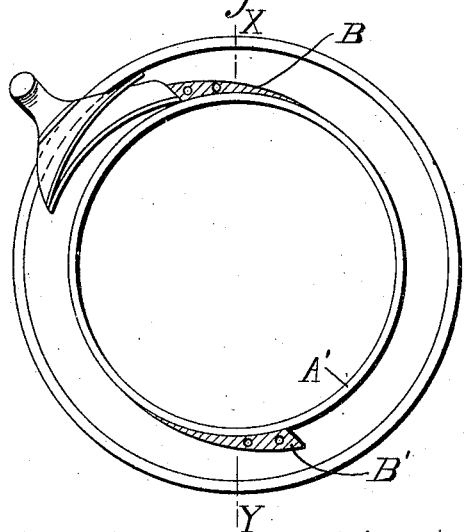
Figure 5:
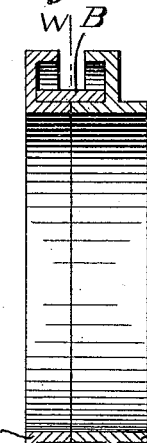
Figure 6:
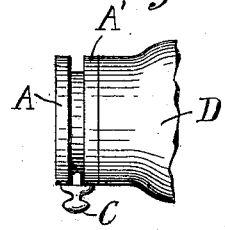

In the annexed drawings Figure 1 is a side view of the left front wheel with my device attached; Fig. 2 is a side view of the pawl; Fig. 3 is a top view of the pawl; Fig. 4 is a longitudinal section on line W Z; Fig. 5 is a transverse section on line X Y; Fig. 6 is a rear view of the left front wheel hub with my device attached.

The bands A A′ have the integral flanges $a$ $a'$ and faces $a^3$, $a^2$. These bands take the place of and serve the purposes of the usual hub bands. The face flanges $a^2$, $a^3$, do not meet but leave a space between. Said bands and flanges form a groove having a slot narrower than the groove itself, around its external face. Mounted on and carried by the bands A A′ are the ratchets B B′. The pawl C is loosely mounted in said groove; it has a lower flange $c^4$ curved to correspond with the bands A A′. This flange $c^4$ prevents the pawl C from falling out through the slot between the faces $a^3$ $a^2$. The rib of the pawl $c^3$ projects through this slot. The upper flange $c'$ assists in keeping the pawl in place. The knob $c$ engages a suitable device on the rein E. The pawl spring $c^2$ serves to keep the end of the pawl $c^4$ in engagement with the ratchets B B′ and also to prevent said pawl rattling when the rein is not attached thereto. The wheel hub is shown at F and the rein at E.

The operation of the device is as follows: When the device is not in use and the wheel is revolving, the spring $c^2$ holds the pawl in place and the pawl is carried around by the wheel. When it is desired to use the device the rein or hitch rope is attached to the knob $c$. If the horse starts, the ratchet B engaging the pawl $c$ wraps the rein around the wheel hub thereby tightening said rein. The flange $c'$ projecting above the hub assists in preventing the rein from slipping over the end of the hub. This tightening of the rein causes the horse to stop. If he backs, as soon as the rein is unwound from the hub, the ratchet slips by the pawl, and the rein is no longer wound on the hub.

Having thus described my said invention I claim:

1. In a horse hitching device, the combination of a band affixed to the wheel hub, said band having a circumferential groove the sides of which are extended over and toward each other in such a manner as to form a peripheral slot narrower than said groove, ratchet teeth affixed to said band, a pawl loosely mounted in and retained by said groove and adapted to engage said ratchet teeth when said band rotates forward, and means to attach said pawl to the reins.

2. In a horse hitching device a divided hub band having the flanges $a$ $a'$ $a^2$ $a^3$ forming a groove with a narrow peripheral slot, ratchet teeth affixed to said bands, a pawl having the flange $c^4$ and the spring $c^2$, and adapted to engage said ratchet teeth when said band rotates forward.

ADRIEN CARDIN.

Witnesses:
　JAMES M. MORTON, Jr.,
　ARTHUR F. NELSON.